US008973110B2

(12) United States Patent
Mizoguchi et al.

(10) Patent No.: US 8,973,110 B2
(45) Date of Patent: Mar. 3, 2015

(54) ELECTRONIC RECEIPT SYSTEM, TERMINAL DEVICE AND METHOD OF PROVIDING ELECTRONIC RECEIPT

(71) Applicants: Kabushiki Kaisha Toshiba, Minato-ku, Tokyo (JP); Toshiba Solutions Corporation, Minato-ku, Tokyo (JP)

(72) Inventors: Yasuyuki Mizoguchi, Tokyo (JP); Tomoo Saito, Tokyo (JP); Nobuyuki Funatsu, Kanagawa-ken (JP); Hiroshi Takashima, Tokyo (JP); Sori Ishigami, Tokyo (JP); Koichiro Iwamoto, Tokyo (JP); Shunichi Morita, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 56 days.

(21) Appl. No.: 13/758,315

(22) Filed: Feb. 4, 2013

(65) Prior Publication Data

US 2013/0145444 A1    Jun. 6, 2013

Related U.S. Application Data

(63) Continuation of application No. PCT/JP2012/005944, filed on Sep. 19, 2012.

(30) Foreign Application Priority Data

Oct. 20, 2011    (JP) .................................. 2011-230619

(51) Int. Cl.
*G06F 7/04* (2006.01)
*G06F 21/32* (2013.01)
(Continued)

(52) U.S. Cl.
CPC .............. *G06F 21/32* (2013.01); *H04L 9/3231* (2013.01); *G06Q 20/02* (2013.01);
(Continued)

(58) Field of Classification Search
CPC ................................. H04L 63/08; H04L 63/10
USPC ........................................................ 726/4–5
See application file for complete search history.

(56) References Cited

U.S. PATENT DOCUMENTS

2005/0139656 A1*  6/2005  Arnouse ....................... 235/382
2012/0218074 A1*  8/2012  Luckhardt .................... 340/5.52

FOREIGN PATENT DOCUMENTS

JP    2001-266092    9/2001
JP    2002-351845    12/2002
(Continued)

OTHER PUBLICATIONS

Notice of Reasons for Refusal issued by the Japanese Patent Office on Nov. 13, 2013, for Japanese Patent Application No. 2012-543389, and English-language translation thereof.

*Primary Examiner* — Anthony Brown
(74) *Attorney, Agent, or Firm* — Finnegan, Henderson, Farabow, Garrett & Dunner, L.L.P.

(57) ABSTRACT

An electronic receipt system includes a terminal device, a first memory unit which a first user has, and a second memory unit which a second user who is a trading partner of the first user has. The terminal device includes biometric authentication obtaining means to obtain biometric authentication information of the first user and biometric authentication information of the second user; electronic tally generating means to generate electronic tallies based on the biometric authentication information of the both users; electronic receipt generating means to generate electronic receipts including transaction information of the first user and the second user, the electronic receipts including a first electronic receipt having one of the electronic tallies and a second electronic receipt having another of the relevant electronic tallies; means to store the first electronic receipt in the first memory unit; and means to make the second electronic receipt to be stored in the second memory unit.

5 Claims, 5 Drawing Sheets

(51) Int. Cl.
  *H04L 9/32*      (2006.01)
  *G06Q 20/02*    (2012.01)
  *G06Q 20/04*    (2012.01)
  *G06Q 20/32*    (2012.01)
  *G06Q 20/40*    (2012.01)

(52) U.S. Cl.
  CPC ....... *G06Q 20/0453* (2013.01); *G06Q 20/3221* (2013.01); *G06Q 20/40145* (2013.01); *G06F 2221/2101* (2013.01); *G06F 2221/2151* (2013.01)
  USPC .......................................................... 726/5

(56) References Cited

FOREIGN PATENT DOCUMENTS

JP    2008-27177    2/2008
JP    2010-204786   9/2010

\* cited by examiner

ELECTRONIC RECEIPT SYSTEM, TERMINAL DEVICE AND METHOD OF PROVIDING ELECTRONIC RECEIPT

CROSS-REFERENCE TO RELATED APPLICATION

This application is a Continuation of International Application No. PCT/JP2012/005944 filed on Sep. 19, 2012, and claims the priority of Japanese Patent Application No. 2011-230619, filed on Oct. 20, 2011, the content of both of which are incorporated herein by reference.

FIELD

Exemplary embodiments described herein relate to an electronic receipt system, a terminal device and a method of providing an electronic receipt which generate an electronic tally and an electronic receipt using biometric authentication technology.

BACKGROUND

In a financial institution, procedures for collecting affairs from a client, and keeping affairs of a document and a passbook from a client are performed with a paper document such as a written receipt. But, there is a problem how to effectively strengthen the checking system of the affairs, such as the checking by a staff. In addition, if a staff intervenes, there are problems such that the affairs become complicated, and a paper may be lost. In the stream of strengthening compliance, it is necessary to perform paperless and reduce paper, and in addition to realize the rationalization and strict operation of clerical affairs.

DETAILED DESCRIPTION

In general, according to one embodiment, there is provided an electronic receipt system includes a terminal device, a first memory unit which a first user has, and a second memory unit which a second user who is a trading partner of the first user has. The terminal device includes biometric authentication obtaining means to obtain biometric authentication information of the first user and biometric authentication information of the second user; electronic tally generating means to generate electronic tallies based on the biometric authentication information of the both users; electronic receipt generating means to generate electronic receipts including transaction information of the first user and the second user, the electronic receipts including a first electronic receipt having one of the electronic tallies and a second electronic receipt having another of the relevant electronic tallies; means to store the first electronic receipt in the first memory unit; and means to store the second electronic receipt in the second memory unit.

Hereinafter, embodiments will be described with reference to the drawings.

Figure 1:
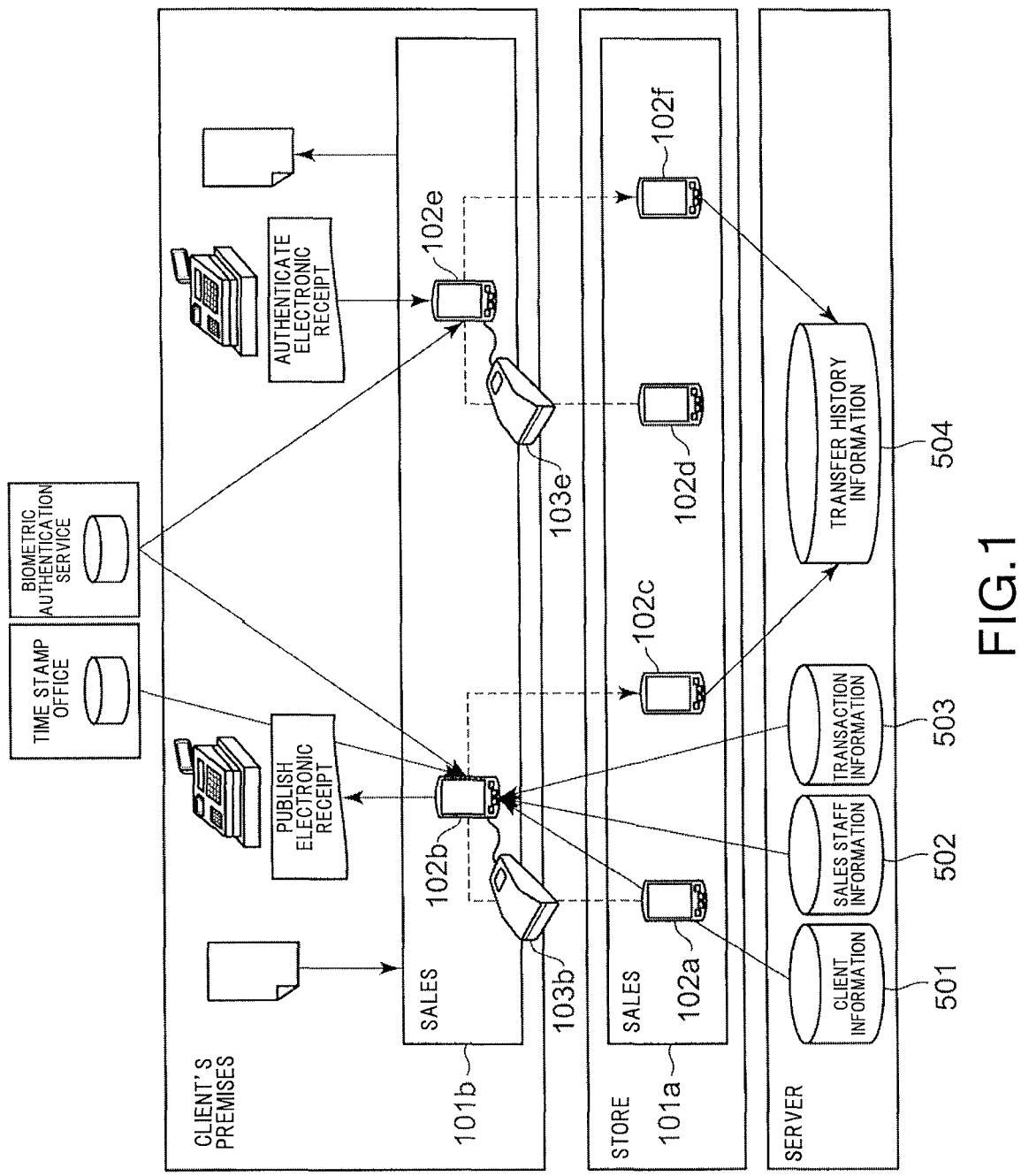
FIG. 1 is a total configuration diagram related to a flow of affairs in an embodiment.

FIG. 1 is a total configuration diagram related to a flow of affairs in the embodiment.

In the embodiment, when a sales staff 101 who is a person in charge of external affairs of a financial institution such as a bank goes off from the store to a client's premises (from 101*a* to 101*b*), the sales staff 101 brings out a mobile terminal 102 that is a device in possession from the store to the client's premises (from 102*a* to 102*b*).

At the client's premises, using the mobile terminal 102, the biometric authentication information of a client stored on an IC card of the client who is a trading partner, and the biometric authentication information of the sales staff 101 himself are read out with an exclusive device 103*b*, the authentication is performed using a biometric authentication service, and that the both are the parties in charge themselves is confirmed. The exclusive device 103*b* is a reader/writer device of an IC card, for example, and is used while connected to the mobile terminal 102.

Next, current day information is downloaded from a database of a server of a core system to the mobile terminal 102. The current day information includes client information 501, sales staff information 502, transaction information 503, and so on. The client information 501 and the sales staff information 502 are each inherent information such as a full name or a name, and an ID, for example. The transaction information 503 is information indicating the content, classification of the transaction, and so on, for example.

And, when the sales staff 101 receives an object such as cash, a bank passbook, and documents from the client, the sales staff 101 inputs the information of the received object as acknowledgment information, and determines the content of the transaction. Along with it, the sales staff 101 obtains time information (a time stamp) from a time stamp office, and obtains position information (GPS information) using a GPS function not shown.

The sales staff 101 operates the mobile terminal 102 to thereby generate original information of an electronic tally based on these collected information. The sales staff 101 divides the generated seed original information of the electronic tally into electronic tallies, and gives one to an electronic receipt (original), gives another to an electronic receipt (copy), and publishes each of them.

The sales staff 101 operates the mobile terminal 102 to thereby distribute the electronic receipt (original) to the client, and to make it be stored in the IC card of the client. The electronic receipt (copy) is stored in the financial institution side. In addition, with respect to the information of received content collected at the time of receipt, the sales staff 101 brings back the mobile terminal 102 from the client's premises to the store (from 102*b* to 102*c*), and uploads the information of the above-described received content to the server to thereby store the information as transfer history information 504 in the data base.

An electronic receipt is one for replacing a document which a financial institution issued to a client in the form of paper so as to certify that some sort of money or documents and so on have been received, by data which is electronically certified. That is, an electronic receipt is data including the transaction information between a financial institution and a client, makes a receipt paperless, and is utilized as a measure for preventing loss and a measure for preventing compromise.

The electronic receipt is data including the electronic tally which is generated based on the information such as the biometric authentication information of the client and the sales staff 101, the client information 501, the sales staff information 502, the transaction information 503, the time stamp, the GPS information.

An electric tally indicates each of pieces of data which is divided with a method to divide and store data such as a file into a plurality of pieces using a hush function and so on. The original data can not be restored from a divided piece.

The electronic tallies in the electronic receipt of the embodiment are information which are divided and possessed by the client and the sales staff 101, and one is stored in the IC card of the client, and another is stored in the financial institution side, and the electronic tallies are ones for certifying the validity of transaction by verifying whether the both information of the client and the sales staff 101 coincide with each other.

Then, at the time of returning the received object to the client, the mobile terminal 102 is brought out again from the store to the client's premises (from 102d to 102e), and the biometric authentication information of the client stored in the IC card of the client who is the trading partner, and the biometric authentication information of the sales staff 101 himself are read out with an exclusive device 103e. Authentication is performed using a biometric authentication service based on the read biometric authentication information of the client, and the read biometric authentication information of the sales staff 101 himself, to confirm that the both are the parties in charge themselves. Along with this, the electronic receipt is received from the IC card of the client, and whether the tally information of the electronic receipt and the tally information of the electronic receipt (copy) stored in the financial institution side coincide with each other is verified. If the verification result has no problem, the verification is performed and the object is returned.

The mobile terminal 102 is brought back from the client's premises to the store (from 102e to 102f), and the result of the return is reflected in the transfer history information 504 of the server.

Accordingly, the paperless is achieved, and because mistakes and confusion due to manual works do not come to occur, the efficiency and strict operation of the affaires can be achieved.

Figure 2:
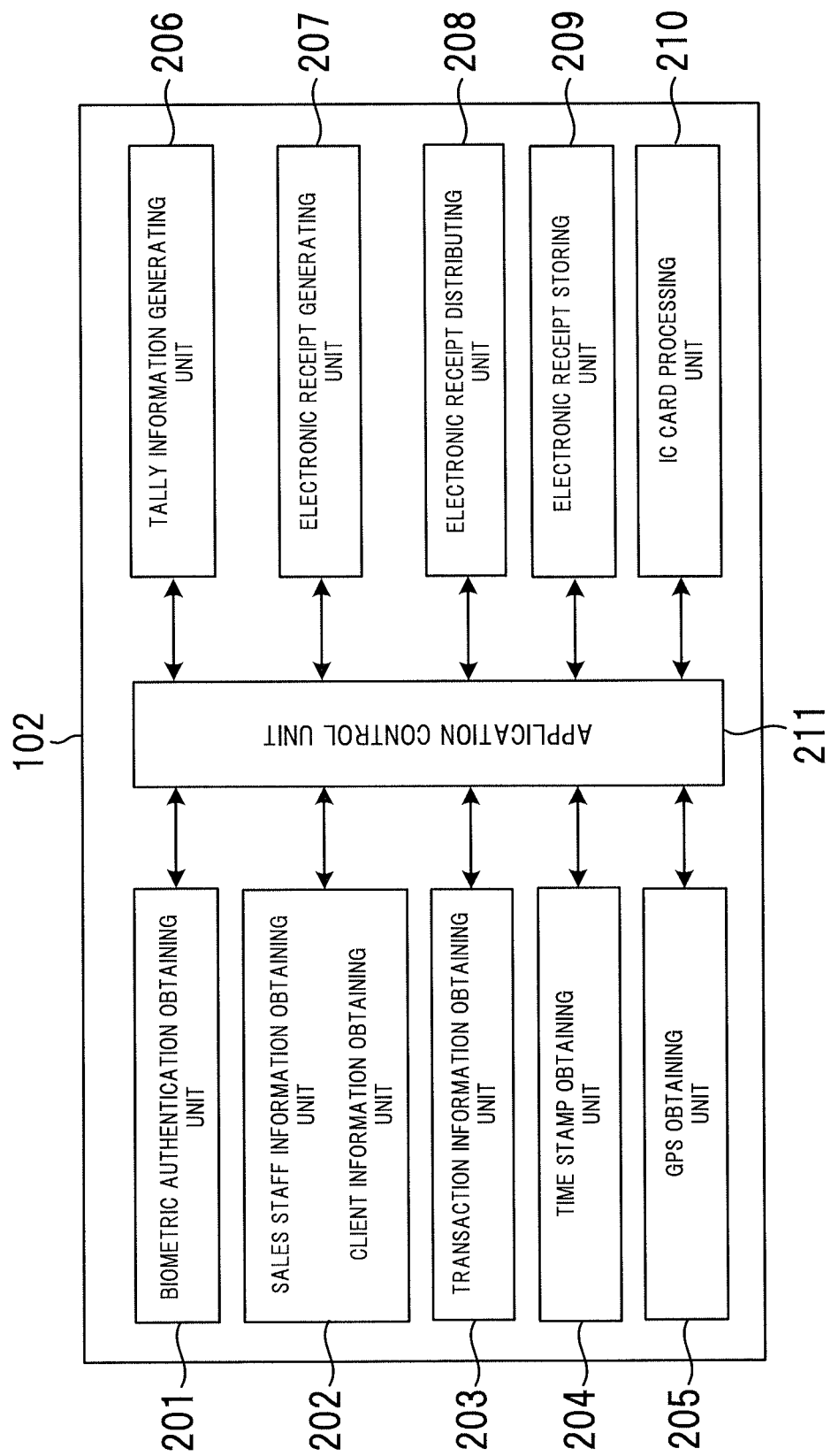
FIG. 2 is a functional block diagram related to the publication of an electronic receipt in the mobile terminal of the embodiment.

FIG. 2 is a functional block diagram related to the publication of the electronic receipt in the mobile terminal of the embodiment.

A biometric authentication obtaining unit 201 performs personal authentication based on the biometric authentication certificate obtained thorough the biometric authentication service. A sales staff information obtaining unit and client information obtaining unit 202 obtains the sales staff information and the client information from the server. A transaction information obtaining unit 203 obtains the transaction information from the server.

A time stamp obtaining unit 204 obtains the time stamp from the time stamp office. A GPS obtaining unit 205 obtains the GPS information using GPS function. A tally information generating unit 206 generates seed information of the tallies based on the information obtained in the respective units of the above-described biometric authentication obtaining unit 201 to the GPS obtaining unit 205, and divides the generated seed information to thereby make the electronic tallies. An electronic receipt generating unit 207 generates the electronic receipt (original) and the electronic receipt (copy) by giving the respective electronic tallies.

An electronic receipt distributing unit 208 distributes the electronic receipt to the server of the financial institution or the IC card of the client. An electronic receipt storing unit 209 stores the electronic receipt (copy) in the database of the financial institution, and an IC card processing unit 210 makes the electronic receipt (original) to be stored in the IC card of the client. An application control unit 211 controls exchange of information between the respective units of the biometric authentication obtaining unit 201 through the IC card processing unit 210.

Figure 3:
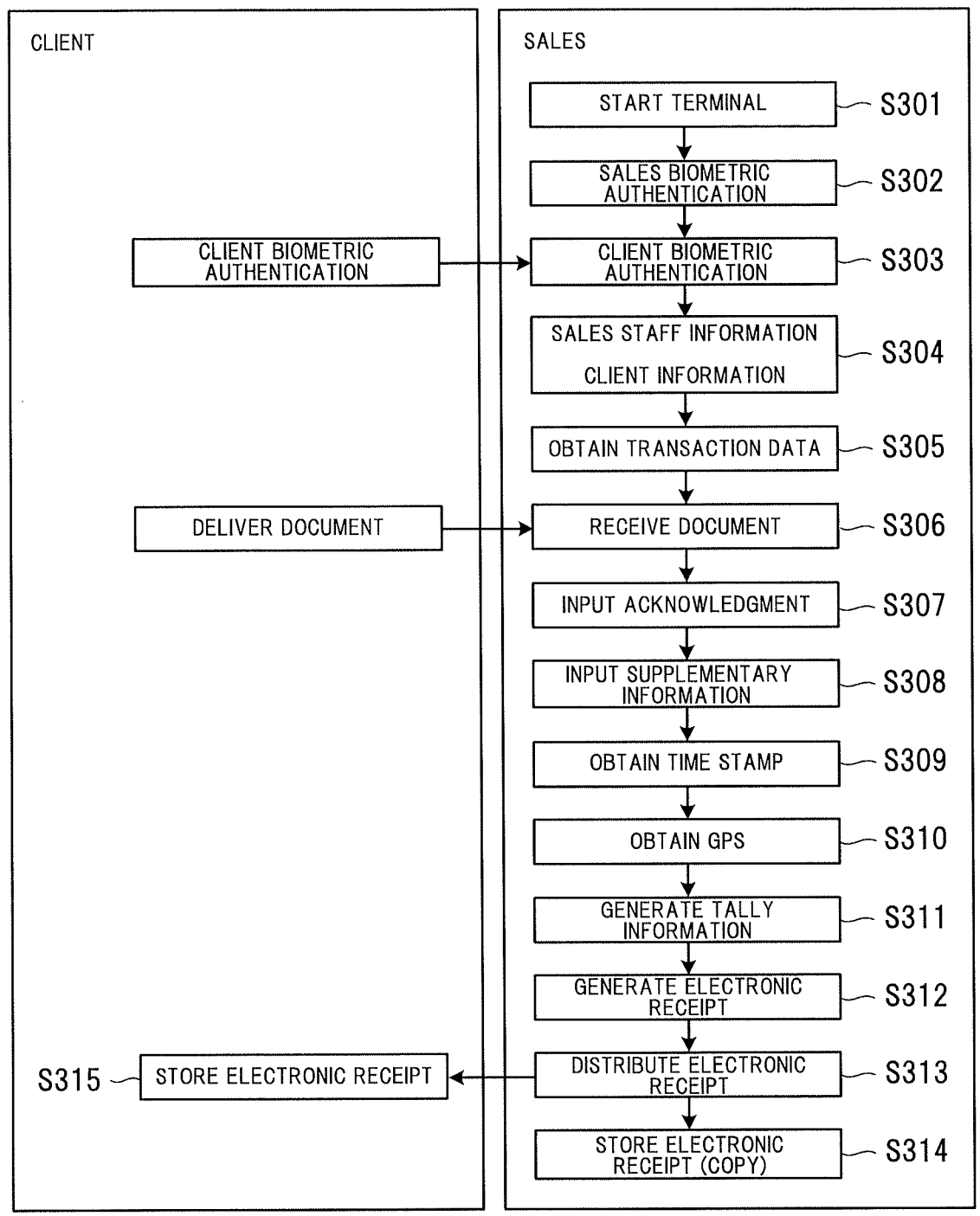
FIG. 3 is a flow chart of a processing related to the publication of the electronic receipt in the embodiment.

FIG. 3 is a flow chart of the processing related to the publication of the electronic receipt in the embodiment.

In the mobile terminal 102 which the sales staff 101 possesses, the application control unit 211 starts up an application to control the transfer of documents and so on (a step S301). The biometric authentication obtaining unit 201 reads out the biometric authentication information of the sales staff 101 and the client stored in the IC card with the exclusive device, performs authentication with the biometric authentication service, confirms that the both are the parties in charge themselves, and concurrently obtains the biometric authentication certificates (steps S302, S303).

Next, the sales staff information obtaining unit and client information obtaining unit 202 obtains the sales staff information and the client information from the sever of a core system (a step S304). The transaction information obtaining unit 203 obtains the transaction information from a transaction master of the server (a step S305).

After having confirmed the transaction content, the sales staff 101 receives the cash, the bank passbook, the documents and so on delivered from the client (a step S306). The transaction information obtaining unit 203 obtains the information of the received object as acknowledgment information (a step S307). Supplementary information (hope of return to the store, and so on) which could not be obtained in the above step related to the received object is registered (a step S308).

The time stamp obtaining unit 204 obtains the time information at the time point of the transaction from the time stamp office (a step S309). The GPS obtaining unit 205 obtains the position information using the GPS function (a step S310).

The tally information generating unit 206 generates the original information of the electronic tallies based on the obtained biometric authentication certificates, the transaction information, the acknowledgment information, the time information, the position information (a step S311). The electronic receipt generating unit 207 divides the generated original information of the electronic tallies into the electronic tallies, and generates the electronic receipt (original) and the electronic receipt (copy) (a step S312).

The electronic receipt is distributed using the electronic receipt distributing function of the electronic receipt distributing unit 208 (a step S313). The IC card processing unit 210 stores the electronic receipt (original) in the IC card of the client through the exclusive device (a step S315). The electronic receipt storing unit 209 stores the electronic receipt (copy) in the database of the financial institution (a step S314).

Figure 4:
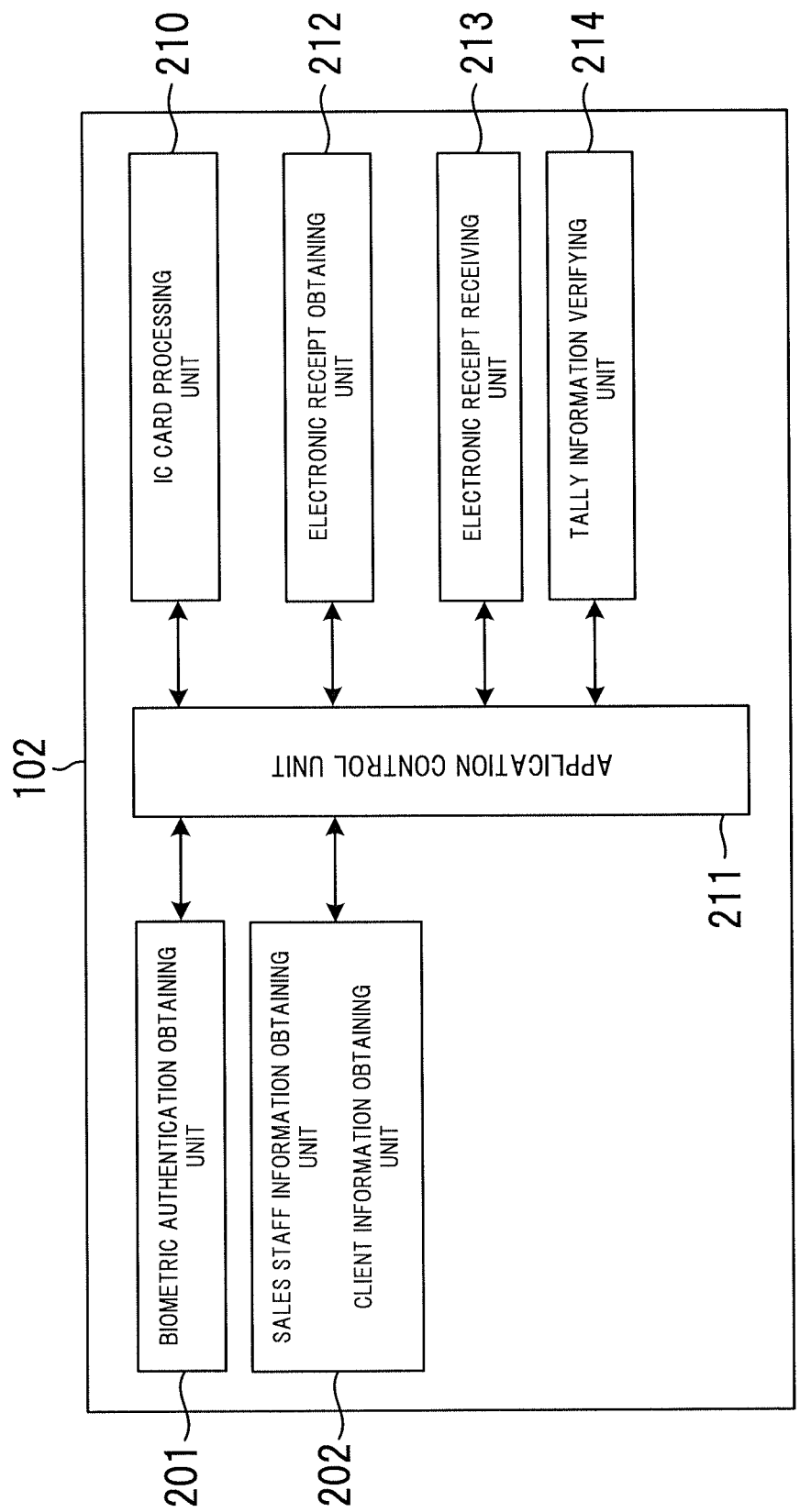
FIG. 4 is a functional block diagram related to the return of a received object in the mobile terminal of the embodiment.

FIG. 4 is a functional block diagram related to the return of a received object in the mobile terminal of the embodiment. In FIG. 4, the same symbols are given to the same portions as the respective portions in the functional block diagram of FIG. 2.

The IC card processing unit 210 makes the electronic receipt on the IC card to be sent through the exclusive device, and an electronic receipt receiving unit 213 receives the sent electronic receipt. An electronic receipt obtaining unit 212 obtains the electronic receipt (copy) from the core system. A tally information verifying unit 214 verifies whether the tally information on the electronic receipt and the electronic receipt (copy) coincide with each other.

Furthermore, the original information of the obtained electronic tallies can also be collated with the biometric authentication certificates of the sales staff 101 and the client obtained in the biometric authentication obtaining unit 201, and the sales staff information and the client information respectively obtained by the sales staff information obtaining unit and the client information obtaining unit 202.

In addition, a processor such as a CPU of a computer of the mobile terminal 102 executes the program stored in a memory unit such as a memory, and thereby the respective units of the biometric authentication obtaining unit 201 to the tally information verifying unit 214 in FIG. 2 or FIG. 4 function as the relevant respective units.

Figure 5:
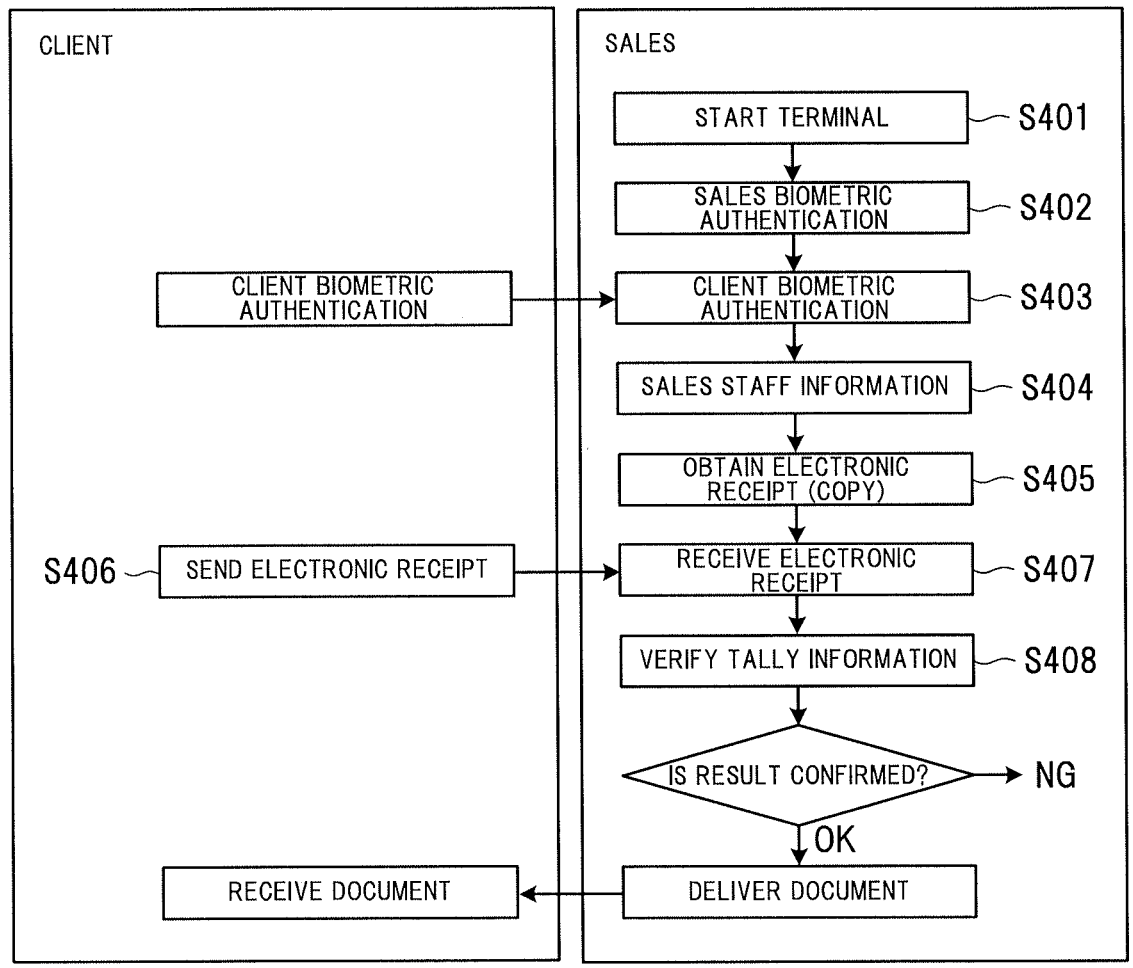
FIG. 5 is a flow chart of a processing related to the return of the received object in the embodiment.

FIG. 5 is a flow chart of a processing related to the return of the received object in the embodiment.

The mobile terminal 102 which the sales staff 101 possesses starts up the application to control the transfer of the documents and so on (a step S401). The processing is executed by the application control unit 211.

The IC card processing unit 210 reads the biometric information of the sales staff 101 and the client stored in the IC card with the exclusive device, and the biometric authentication obtaining unit 201 performs the authentication with the biometric authentication service, and confirms that the both are the parties in charge themselves, and concurrently obtains the biometric authentication certificates (steps S402, S403).

Next, the sales staff information is obtained from the core system (a step S404). The electronic receipt obtaining unit 212 obtains the information of the electronic receipt (copy) stored in the financial institution (a step S405).

Along with this, the IC card processing unit 210 makes the electronic receipt information to be sent from the IC card of the client (a step S406). And, the electronic receipt receiving unit 213 receives the electronic receipt (s step S407).

The tally information verifying unit 214 verifies whether the respective tally information provided on the electronic receipt (original) and the electronic receipt (copy) coincide with each other (a step S408). If the result is OK, documents and so on are delivered to the client. The client receives the documents and so on.

As described above, a mobile terminal of the present embodiment is adopted as a terminal of a sales staff of a financial institution, and thereby paper documents become unnecessary, and there is no possibility of the loss of paper, and this links to the shortening the time required for the procedure, and the promotion of the clerical efficiency can be achieved. Accordingly, this contributes to enhancement of the value of the sales staff's visit. Because one terminal of a sales staff is used, a client does not need to prepare a device.

It is not until that the client and the sales staff 101 are the parties in charge themselves is verified, that the processing to transfer the received object is performed. An electronic receipt is utilized, and that the tally information coincide with each other is confirmed, and thereby the validity of transaction can be confirmed. Because the transaction information is stored in an IC card of a client and is thereby made paperless, a printing equipment such as a printer becomes unnecessary. In the transfer to a client, a problem such as to have handed or not to have handed can be prevented.

In addition, because an electronic tally is used, there is no risk such as to store password information of a client in the form of a paper or data as in the case of a password.

An electronic receipt and biometric authentication information of a client is stored only in an IC card of the client, and not stored in a financial institution side, there is no risk such as deletion or falsification by the financial institution side. In addition, because an IC card is not brought out to the outside, a risk of the leakage on a network can be avoided. The convenience of a client can be enhanced.

As described above, while certain embodiments of the present invention have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic receipt system comprising a terminal device, a first memory unit associated with a first user, and a second memory unit associated with a second user who is a trading partner of the first user, the terminal device including:

biometric authentication obtaining means for obtaining biometric authentication information of the first user from the first memory unit and biometric authentication information of the second user from the second memory unit;

electronic tally generating means for generating electronic tallies based on the biometric authentication information of the first user and the second user and time stamp information;

electronic receipt generating means for generating electronic receipts that include transaction information associated with the first user and the second user, the generated electronic receipts including a first electronic receipt having a first generated electronic tally and a second electronic receipt having a second generated electronic tally;

means for storing the first electronic receipt; and means for storing the second electronic receipt in the second memory unit.

2. The system of claim 1, wherein the terminal device includes:

electronic receipt receiving means for receiving the second electronic receipt; and tally information verifying means for verifying that the first generated electronic tally and the second generated electronic tally coincide with each other.

3. A terminal device, comprising:

biometric authentication obtaining means for obtaining biometric authentication information of a first user and biometric authentication information of a second user who is a trading partner of the first user;

electronic tally generating means for generating electronic tallies based on the biometric authentication information of the first user and the second user and time stamp information;

electronic receipt generating means for generating electronic receipts that include transaction information associated with the first user and the second user, the electronic receipts including a first electronic receipt having a first generated electronic tally and a second electronic receipt having a second generated electronic tally;

means for storing the first electronic receipt; and means for storing the second electronic receipt in a memory unit associated with the second user.

4. A method of providing an electronic receipt, comprising:

obtaining biometric authentication information of a first user and biometric authentication information of a second user who is a trading partner of the first user;

generating electronic tallies based on the biometric authentication information of the first user and the second user and time stamp information;

generating electronic receipts that include transaction information associated with the first user and the second user, the electronic receipts including a first electronic receipt having a first generated electronic tally and a second electronic receipt having a second electronic tally;

storing the first electronic receipt; and storing the second electronic receipt in a second memory unit associated with the second user.

5. The system of claim 1, wherein the means for storing the first electronic receipt is a database and the first electronic receipt is stored in the database as transfer history information.

\* \* \* \* \*